2 Sheets--Sheet 1.

W. S. SAMPSON.

Lime-Kiln.

No. 6,495.

Reissued June 22, 1875.

Witnesses:
W. S. Sampson Jr
Homer S. Beardsley.

Inventor:
Wm. S. Sampson
By A. L. Merriam, Atty.

THE GRAPHIC CO. PHOTO-LITH. 39 & 41 PARK PLACE, N.Y.

2 Sheets--Sheet 2.

W. S. SAMPSON.

Lime-Kiln.

No. 6,495.

Reissued June 22, 1875.

Witnesses:
W. S. Sampson Jr
Homer S. Beardsley

Inventor:
Wm. S. Sampson.
By A. L. Munson
Atty.

THE GRAPHIC CO. PHOTO-LITH. 39 & 41 PARK PLACE, N.Y.

UNITED STATES PATENT OFFICE.

WILLIAM S. SAMPSON, OF NEW YORK, N. Y., ASSIGNOR OF ONE-HALF INTEREST TO HOMER S. BEARDSLEY, OF SAME PLACE.

IMPROVEMENT IN LIMEKILNS.

Specification forming part of Letters Patent No. 149,415, dated April 7, 1874; reissue No. 6,495, dated June 22, 1875; application filed April 10, 1875.

DIVISION B.

*To all whom it may concern:*

Be it known that I, WILLIAM S. SAMPSON, of the city, county, and State of New York, have invented certain new and useful Improvements in Central Draft-Flues for Furnaces or Kilns, for the Calcining of Lime and Roasting of Ores; and I do hereby declare that the following is a full, clear, and exact description of the same.

The object of my invention is to provide a method of increasing and better controlling the draft in furnaces or kilns which are designed for and used in the calcining of lime, the roasting of ores, and the burning of cement and plaster, and similar materials. This I accomplish by drawing the flame and heat toward the center of the furnace or kiln, and through its contents, thereby insuring a more regular and perfect combustion, giving a better control of the fires, and increasing the production of the furnace or kiln; and the means I employ for producing these results consist in the introduction into the furnace or kiln of a centrally-suspended draft-flue, the nature, construction, and operation of which will be fully described and pointed out.

Figure 1:
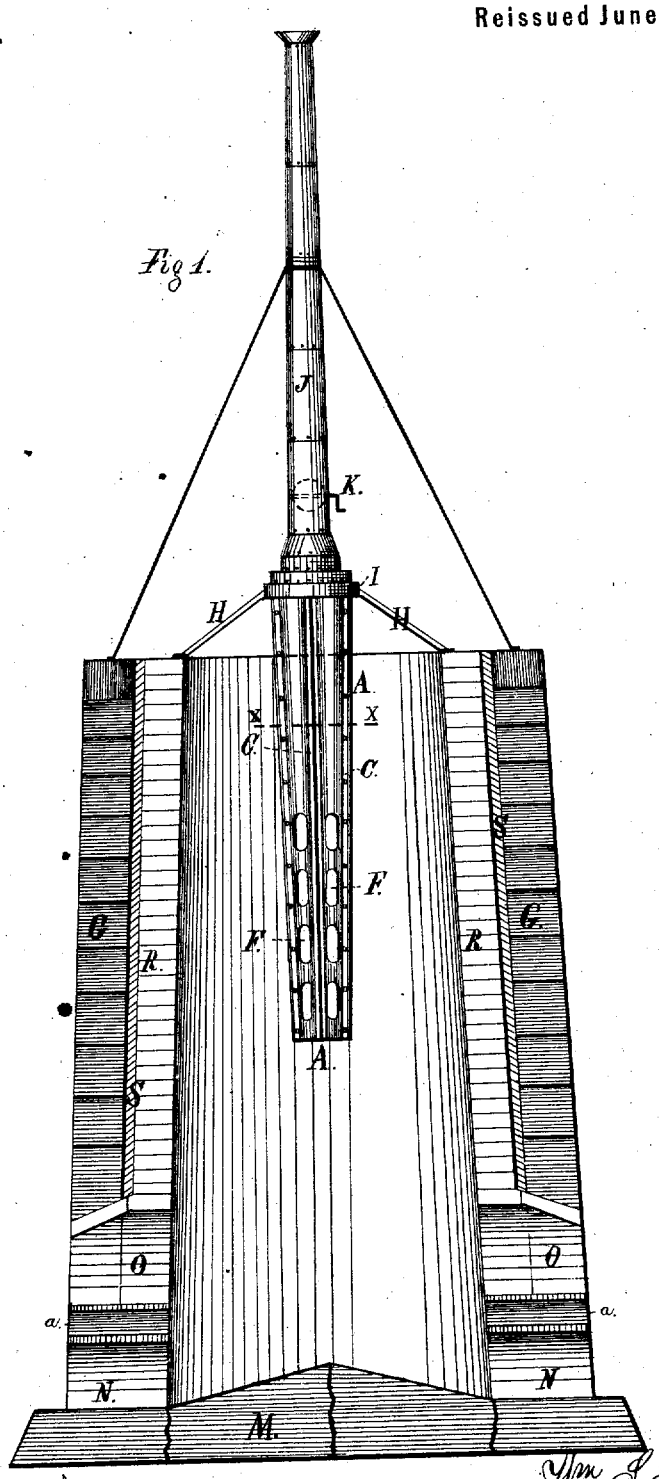
Figure 2:
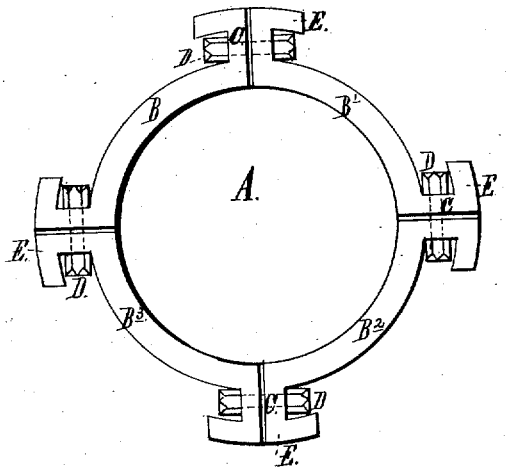

In the drawings, which form a part of this specification, Figure 1 is a sectional elevation of an ordinary furnace or kiln, to which is applied my improved draft-flue. Fig. 2 is an enlarged sectional view of the draft-flue, taken on line *x x* in Fig. 1.

Similar letters of reference indicate corresponding parts.

In Figure 1 I have shown my centrally-suspended draft-flue as applied to an ordinary lime-kiln or furnace, the base of which, at its center, is raised for the purpose of chuting the calcined material toward the draw-doors N, which are of ordinary construction. G are the walls of the furnace. R is the fire-brick lining, both constructed and applied in the usual manner. S is the narrow dead-air space between the walls for the purpose of providing for their expansion. O O are the fire-chambers lined with fire-brick, and *a a* are the ash-pits, all of the usual construction. A represents the centrally-suspended draft-flue, and J the smoke stack or chimney, both shown in position in the furnace or kiln ready for use. This draft-flue, in the present instance, is shown as constructed in four sections, as seen plainly in Fig. 2 of the drawings. These sections may be of cast metal or rolled from wrought metal, as may be desired. The flue varies in its length and diameter, according to the depth and capacity of the furnace into which it is to be inserted. It is constructed in the general form shown at A in Fig. 1 of the drawings. It is provided on its entire length with longitudinal flanges C, of the form shown plainly in Fig. 2. Each projection in each section of the flue forms one-half of each flange. The four sections B $B^1$, $B^2$, and $B^3$, form the complete flue, and are held firmly together by means of the bolts and nuts D. The flanges C have returning flanges E at their outer edges, and they extend the entire length of the flue for the purpose of protecting the heads of the bolts from injury. Through the walls of the flue in each section, between the longitudinal flanges C, are formed a series of openings or inlets, F, (shown in Fig. 1,) which openings are provided for the purpose of permitting the free passage of the smoke and gases from the fires into the flue, and thence to the open air through the flue and stack. These openings or inlets are of any desired number, and are placed at such intervals in the length of the flue as will cause a free draft toward them from the fires in the fire-chambers at the base of the furnace or kiln. The flanges C and E of the flue also serve to form chambers or spaces on the exterior surface of the flue, which spaces materially aid the draft of the kiln. They also serve to protect the main body of the flue from excessive friction caused by the rapid descent of the contents of the kiln following the intervals of drawing.

The flue is made tapering from top to bottom, the base being the smallest in diameter. (Seen plainly in Fig. 1.) This form of construction is very important and essential for the purpose of protecting the flue from injury and preventing it from being carried down with the charge of material when it is following in a mass after each draw. By reason of this tapering form of the flue the material composing the contents of the furnace or kiln, in consequence of descending in vertical lines, falls away, practically speaking, from the flue; hence the flue remains steadily in position and undisturbed when the material again settles down into place. The flue at its apex is provided with a projecting collar, I, which rests on supporting-bars H, which rest on the top of the furnace-walls, the entire arrangement being such that the flue is enabled to swing in its supports to some extent, so that in case the charge of material in the furnace or kiln presses against it more in one direction than another it will be free to move and relieve itself from such pressure without undue strain upon itself or upon its supports. Any other suitable arrangement will answer for the same purpose, and may be varied to suit each particular case.

The smoke stack or chimney J may be of any ordinary construction from sheet metal, and may be of such length and diameter as each case may demand. It is provided with a damper, K, of ordinary form, for the purpose of regulating the draft. It is a well-known fact that, in the majority of furnaces or kilns, as now constructed and used, for the purposes of calcining and burning stone, or for roasting of ores, the flame and heat from the fire-chambers do not by natural draft reach the center of the charge of material, but seek their outlet between the stones or ore and the inner wall of the furnace or kiln. As a consequence the combustion of the fuel in the fire-chambers is not only very defective, but it is actually impeded, and often to such an extent that it results in causing the fires to die out for want of draft. Particularly is this the case when the stone or ore is charged into the furnace or kiln in small pieces. In the ordinary furnace or kiln using the ordinary mode of draft the flame and heat do not reach the center of the same; hence the process of calcination, roasting, or burning consumes an unnecessary time and an unnecessary amount of fuel, and the material when issuing from the furnace or kiln is, in consequence, lacking in uniformity of manipulation. My centrally-suspended draft-flue is a complete and radical remedy for all of these defects, for the reason that the heat and flame are drawn through the entire charge of stones or ores toward the flue, and, consequently, away from the inner walls of the furnace or kiln, and thus, by giving a more regular and uniform combustion, all of the flame and heat is utilized, and by passing through every part of the charge it results in a very large increase in the production from the furnace or kiln. This central draft-flue also relieves the fire-brick inner wall from the action of the intense heat to which this wall is submitted. For this reason the cost of repairs on furnaces and kilns provided with my draft-flue is greatly reduced and almost entirely obviated.

Practical and repeated tests of this central draft-flue, as applied to the ordinary furnaces or kilns now in use, have been made, showing as results an increase of nearly one-half in the production over that previously obtained, together with a great saving in both labor and fuel, and a corresponding reduction in the cost of repairs. This centrally-suspended draft-flue may be applied to all of the well known forms of furnaces or kilns now in use for any of the purposes of calcining or burning stone, oyster-shells, &c., and for the roasting of ores of all descriptions; also my improved form of furnaces and kilns for same purposes, for which I have made application for Letters Patent of even date herewith.

I prefer the form of construction as hereinbefore described, as it best suits the purposes of my invention, which is in main the application of a central draft to a furnace or kiln by means of a suspended draft-flue. It will be understood that the application of my centrally-suspended draft-flue is to "perpetual furnaces and kilns" only, which furnaces or kilns are provided with a series of fire-chambers in the walls of and near the base of such kilns. My invention is not adapted to the so-called "set kilns," into which the fuel and material are charged in alternate layers. These kilns have no fire-chambers, and the burned, roasted, or calcined material, refuse, ashes, &c., are usually drawn therefrom together.

Having thus fully described my invention, what I claim as new, and desire to secure by Letters Patent, is—

1. In a perpetual furnace or kiln arranged and adapted for the calcining of lime, the roasting of ores, the burning of cement and plaster, and other similar materials, said furnace or kiln being provided with one or more fire-chambers and ash-pits in its circumference near its base, the combination, with such furnace or kiln and its fire-chambers, of a centrally-suspended draft-flue, made tapering from top to bottom, and by means of which the heat, gases, and flame are drawn from the fire-chambers, through the charge of stone or ore, toward the center of the furnace or kiln to such flue, and escaping therefrom substantially as and for the purposes herein shown and set forth.

2. A draft-flue to be suspended in a furnace or kiln arranged for the calcining of lime, roasting of ores, &c., made tapering from its apex to its base, provided with longitudinal flanges C, having returning flanges E constructed in the sections B, $B^1$, $B^2$, and $B^3$, the whole combined, arranged, and operating substantially as and for the purposes as herein shown and described.

3. In combination with a draft-flue, suspended in a furnace or kiln, as herein described, the smoke stack or chimney J provided with damper K, arranged and operating as and for the purposes as set forth.

In testimony whereof I have hereunto set my hand and affixed my seal this 8th day of April, 1875.

WM. S. SAMPSON. [L. S.]

In presence of—
A. L. MUNSON,
HOMER S. BEARDSLEY.